United States Patent
Maeda

(10) Patent No.: US 11,163,226 B2
(45) Date of Patent: *Nov. 2, 2021

(54) LIGHT SOURCE SYSTEM AND PROJECTION DISPLAY APPARATUS

(71) Applicant: Panasonic Intellectual Property Management Co., Ltd., Osaka (JP)

(72) Inventor: Makoto Maeda, Nara (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/027,869

(22) Filed: Sep. 22, 2020

(65) Prior Publication Data

US 2021/0003912 A1 Jan. 7, 2021

Related U.S. Application Data

(63) Continuation of application No. 15/800,076, filed on Nov. 1, 2017, now Pat. No. 10,816,883.

(30) Foreign Application Priority Data

Nov. 29, 2016 (JP) .............................. JP2016-230888
Sep. 19, 2017 (JP) .............................. JP2017-179279

(51) Int. Cl.
*G03B 21/20* (2006.01)
*F21V 13/08* (2006.01)
(Continued)

(52) U.S. Cl.
CPC .......... *G03B 21/2033* (2013.01); *F21V 13/08* (2013.01); *G02B 26/008* (2013.01); *G03B 21/204* (2013.01); *G03B 33/08* (2013.01); *H04N 9/3102* (2013.01); *H04N 9/3114* (2013.01); *H04N 9/3144* (2013.01);
(Continued)

(58) Field of Classification Search
None
See application file for complete search history.

(56) References Cited

U.S. PATENT DOCUMENTS

2011/0240720 A1 10/2011 Okada
2012/0230013 A1 9/2012 Xu
(Continued)

FOREIGN PATENT DOCUMENTS

JP 2005-128169 5/2005
JP 2005-303195 10/2005
(Continued)

*Primary Examiner* — Michelle M Iacoletti
*Assistant Examiner* — Danell L Owens
(74) *Attorney, Agent, or Firm* — Wenderoth, Lind & Ponack, L.L.P.

(57) ABSTRACT

A light source system includes an excitation light source, a fluorescent plate that emits fluorescence when exposed to the excitation light from the excitation light source, and a compartment storing the fluorescent plate. The compartment has a heat-receiving section and a heat-dissipation section thermally connected to each other. The heat-receiving section is located opposite a fluorescence light output side of the fluorescent plate, in the compartment. The heat-dissipation section is outside the compartment.

14 Claims, 13 Drawing Sheets

(51) Int. Cl.
*H04N 9/31* (2006.01)
*G02B 26/00* (2006.01)
*G03B 33/08* (2006.01)
*G02B 27/14* (2006.01)
*G03B 21/00* (2006.01)

(52) U.S. Cl.
CPC ......... *H04N 9/3155* (2013.01); *H04N 9/3158* (2013.01); *H04N 9/3161* (2013.01); *G02B 27/141* (2013.01); *G03B 21/008* (2013.01); *G03B 21/2066* (2013.01)

(56) References Cited

U.S. PATENT DOCUMENTS

| | | |
|---|---|---|
| 2013/0335989 A1 | 12/2013 | Sato |
| 2014/0211169 A1 | 7/2014 | Kitano |
| 2016/0077326 A1* | 3/2016 | Yamagishi ............. G02B 7/008 353/61 |
| 2016/0161736 A1 | 6/2016 | Chou |
| 2016/0219256 A1 | 7/2016 | Tsai |
| 2016/0349605 A1 | 12/2016 | Kitade |
| 2017/0215271 A1 | 7/2017 | Ito |
| 2018/0011392 A1 | 1/2018 | Utsunomiya |
| 2018/0149953 A1 | 5/2018 | Nomoto |

FOREIGN PATENT DOCUMENTS

| | | |
|---|---|---|
| JP | 2014-146056 | 8/2014 |
| JP | 2014/160227 | 9/2014 |
| JP | 2016-51092 | 4/2016 |
| JP | 2016-066061 | 4/2016 |
| JP | 2016-110985 | 6/2016 |
| WO | 2016/147226 | 9/2016 |

* cited by examiner

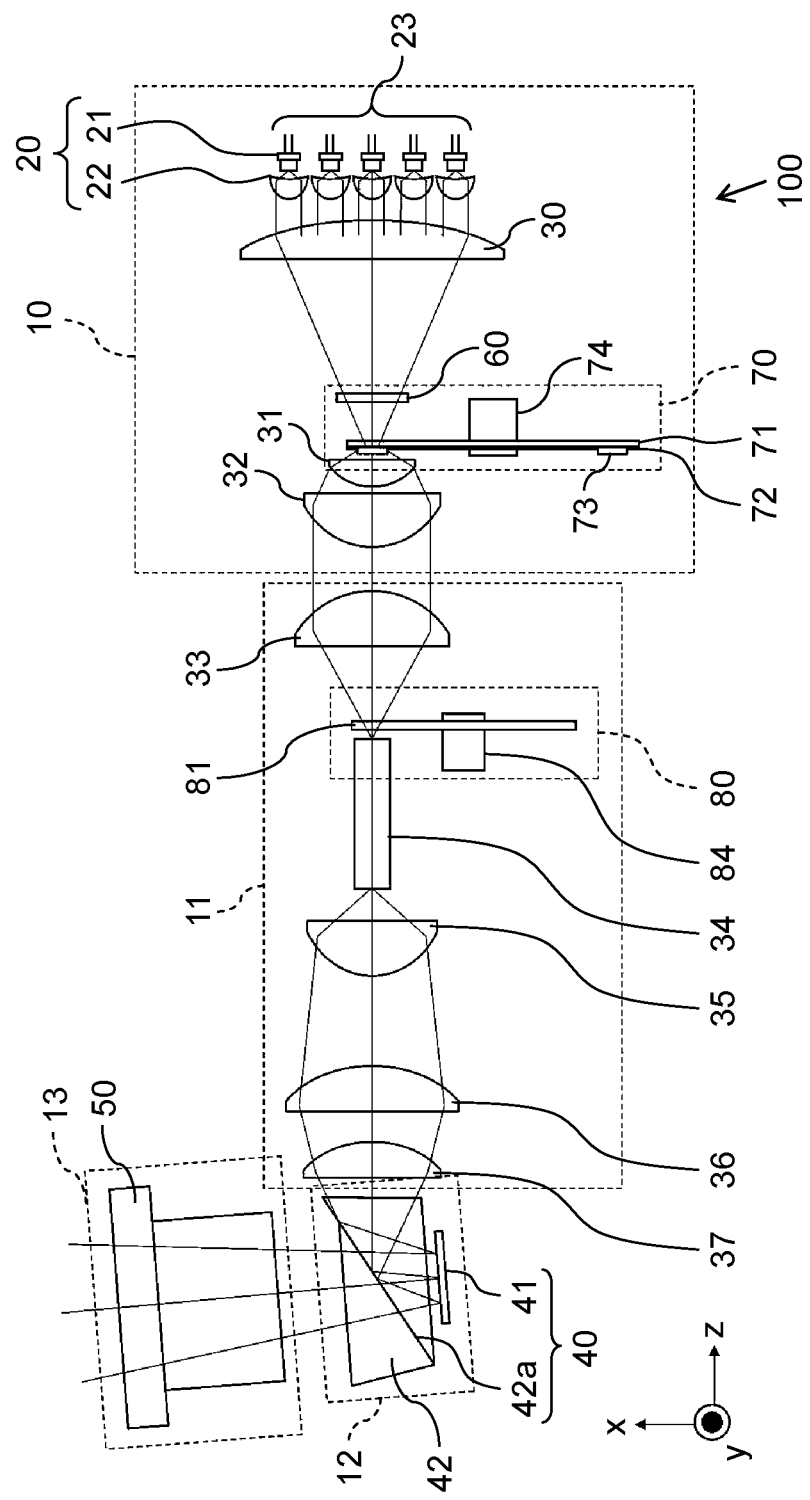

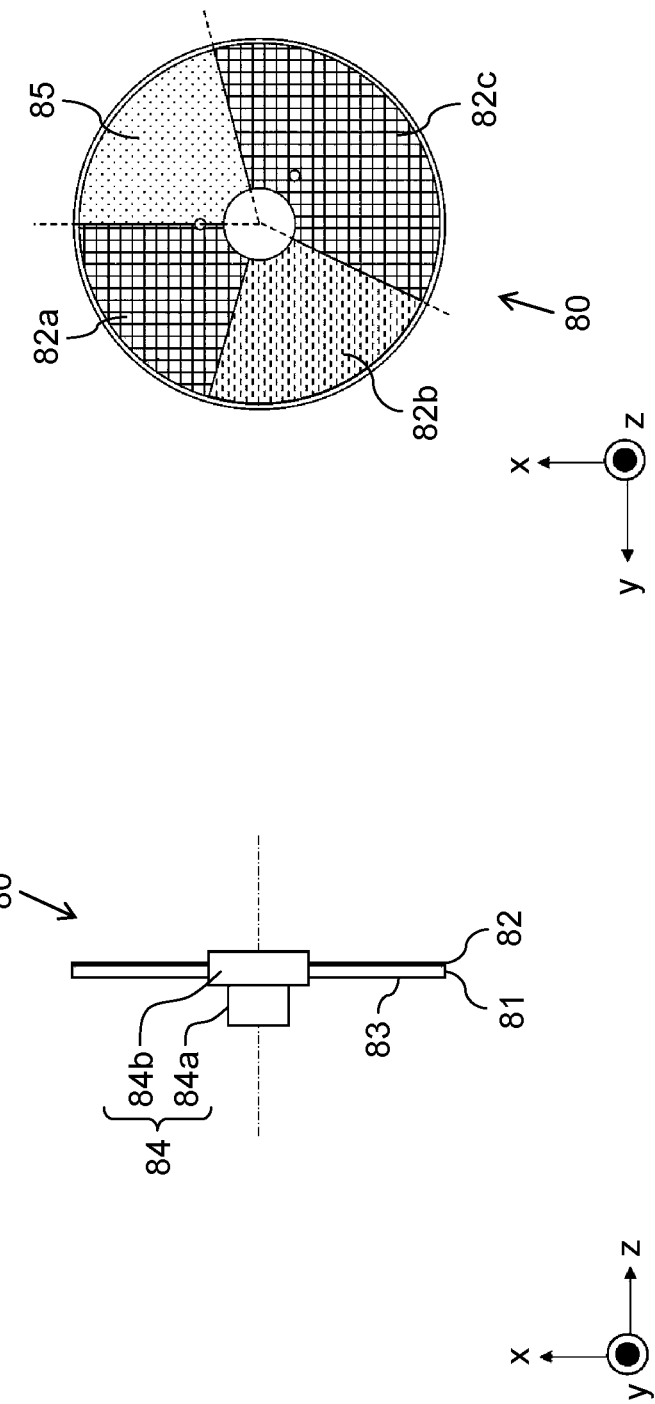

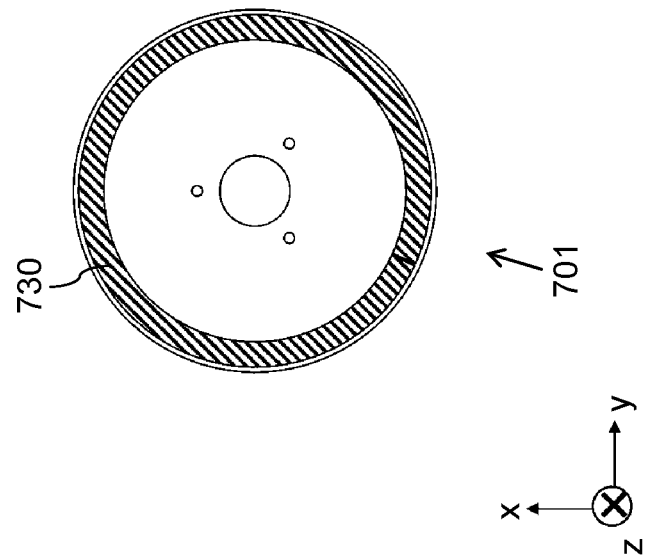
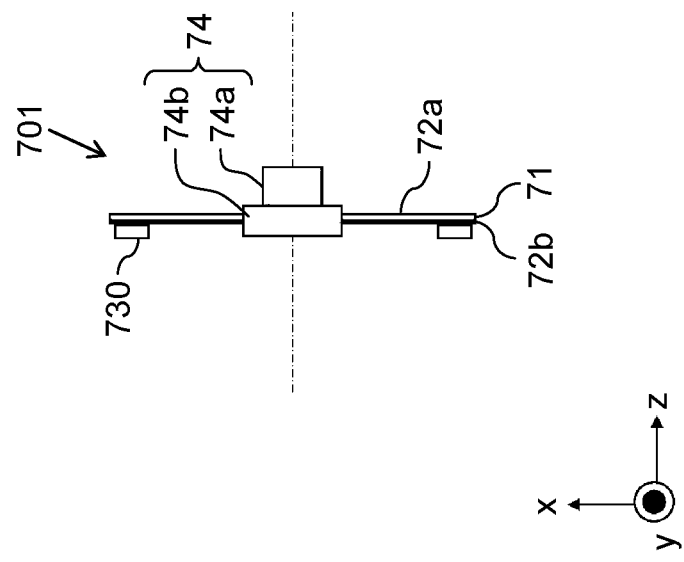

LIGHT SOURCE SYSTEM AND PROJECTION DISPLAY APPARATUS

BACKGROUND

1. Technical Field

The present disclosure relates to a light source system and a projection display apparatus including the light source system.

2. Description of Related Art

Some types of light sources for projection display apparatuses contain a high-intensity, high-pressure mercury lamp. Such mercury lamps, however, may not light up immediately or may have trouble with maintenance because of their short life spans. To avoid these disadvantages, it has been proposed to use solid-state light-emitting elements such as laser light sources and light emitting diodes as the light sources for projection display apparatuses.

For example, Japanese Unexamined Patent Application Publication No. 2014-160227 discloses a light source system including the following: a blue laser light source (laser light source) also functioning as an excitation light source, a phosphor wheel composed of a rotating base and segmented phosphors coated on the base, and a color wheel. The phosphor wheel emits fluorescence, and the color wheel allows selected wavelengths of the fluorescence to pass through it and reflects the remaining wavelengths, so that desired color light is emitted from the color wheel in a time division manner.

These light sources for exciting phosphors, however, need to dissipate the heat generated in phosphors during fluorescence illumination. To meet this necessity, Japanese Unexamined Patent Application Publication No. 2014-146056 discloses a light source system that includes a casing for storing phosphors with a cooling structure. The cooling structure cools the atmosphere in the casing so as to lower the temperature of the phosphors.

SUMMARY

The light source system according to the present disclosure includes an excitation light source, a fluorescent plate that emits fluorescence when exposed to the excitation light from the excitation light source, and a compartment storing the fluorescent plate. The compartment has a heat-receiving section and a heat-dissipation section thermally connected to each other. The heat-receiving section is located opposite a fluorescence light output side of the fluorescent plate, in the compartment. The heat-dissipation section is outside the compartment.

The light source system according to the present disclosure appropriately cools the phosphor wheel, which is hermetically stored in the compartment.

BRIEF DESCRIPTION OF DRAWINGS

FIG. 1 is a configuration of a projection display apparatus according to a first exemplary embodiment of the present disclosure;

FIG. 3A and FIG. 3B are configurations of a color filter wheel according to the first exemplary embodiment of the present disclosure;

FIG. 11A and FIG. 11B are configurations of a fluorescent plate according to the second exemplary embodiment of the present disclosure;

DETAILED DESCRIPTION

Figure 2A:
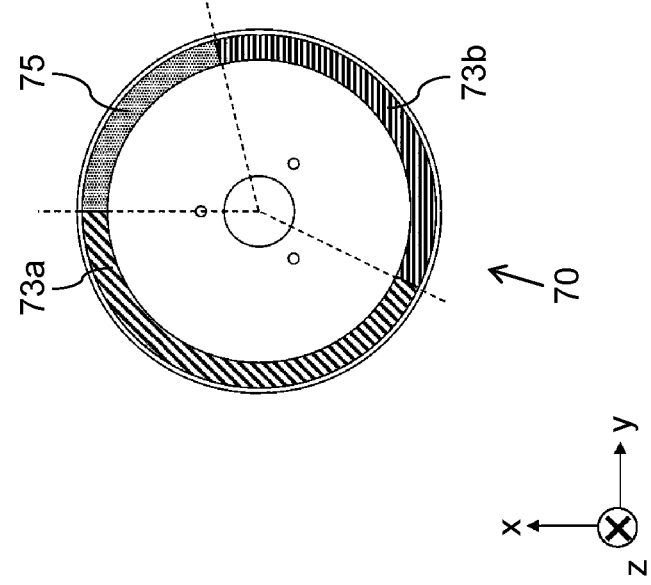
FIG. 2A and FIG. 2B are configurations of a phosphor wheel according to the first exemplary embodiment of the present disclosure.

Exemplary embodiments will be described in detail as follows with reference to the accompanying drawings. In the exemplary embodiments, the description of well-known matter and of substantially the same configuration as described earlier may be omitted to avoid redundancy and help those skilled in the art understand them easily. Note that the attached drawings and the following description are provided to make those skilled in the art fully understand the present disclosure, and are not intended to limit the claimed subject matter.

In the drawings, like components are labeled with like reference numerals with respect to the light source systems and the projection display apparatuses according to the following exemplary embodiments of the present disclosure. The drawings are only schematic and the dimensional ratios are not the same as the actual ones. Therefore, actual dimensions should be determined by considering the following description. It goes without saying that the dimensional relations and ratios of some components may be different between these drawings.

In the following exemplary embodiments, projection display apparatuses are taken as an example of employing the light source system according to the present disclosure. The light source system according to the present disclosure can alternatively be employed in other apparatuses such as video display apparatuses including TVs and illumination apparatuses including head lamps.

First Exemplary Embodiment

A projection display apparatus according to a first exemplary embodiment will now be described with reference to drawings.

Overview of Projection Display Apparatus 100

FIG. 1 is an optical configuration of projection display apparatus 100 according to the first exemplary embodiment.

Projection display apparatus 100 includes light source system 10, illumination apparatus 11, imaging unit 12, and projection unit 13. Light source system 10 emits component lights. Illumination apparatus 11 uniforms the light from light source system 10 and emits illumination light. Imaging unit 12 modulates the illumination light from illumination apparatus 11 with a video signal and emits modulated light. Projection unit 13 projects the modulated light from imaging unit 12, on an enlarged scale, onto a screen. Projection display apparatus 100 of the present exemplary embodiment is a projection display apparatus mounted with one imager 41, such as a digital mirror device (DMD) that modulates illumination light with a video signal.

Structure of Light Source System 10

Light source system 10 includes light source 20. Light source 20 includes semiconductor lasers as laser light sources 21 and collimator lenses 22. Laser light sources 21 are an example of a solid-state light source.

Laser light sources 21 emit blue laser light (e.g., with a wavelength of 455 nm), which has the highest luminous efficiency of the three primary colors (RGB). Laser light sources 21 are in the form of laser light source array 23 arranged in a matrix in order to produce high-power output component light. Light source 20 includes a heat sink (not shown in the figures) for air cooling behind laser light source array 23. Collimator lenses 22, which are located on the emission side of laser light sources 21, collimate the light coming from laser light sources 21.

The blue laser light from light source 20 is collected and superimposed by condenser lens 30. The superimposed laser light passes through diffuser 60 and is irradiated as excitation light to phosphor 73 on phosphor wheel 70. Diffuser 60 has the function of reducing the interference of light emitted from light source 20. Phosphor wheel 70 will be detailed later.

Transparent base plate 71 of phosphor wheel 70 allows laser light to pass through it, and phosphor 73 of phosphor wheel 70 emits fluorescence when the laser light is irradiated.

Thus, the blue laser light from light source 20 is not only blue image-light but also excitation light E (see FIG. 7) that emits fluorescence from phosphor 73 of phosphor wheel 70. By irradiating to the excitation light E, phosphor 73 emits fluorescence F (see FIG. 7) with a different wavelength range from the excitation light E incident from light source 20.

The excitation light E and the fluorescence F emitted from phosphor wheel 70 are collimated by a collimator-lens group including lenses 31 and 32, and then irradiated to color filter wheel 80 through lens 33. Color filter wheel 80 will be detailed later.

Color filter wheel 80 allows selected wavelengths of the fluorescence F to pass through it and reflects the remaining wavelengths, so that the fluorescence F has a desired color component lights. After transmitting color filter wheel 80, the excitation light E and the color component lights from fluorescence F are incident on rod integrator 34, Structure of Phosphor Wheel 70

Figure 2B:
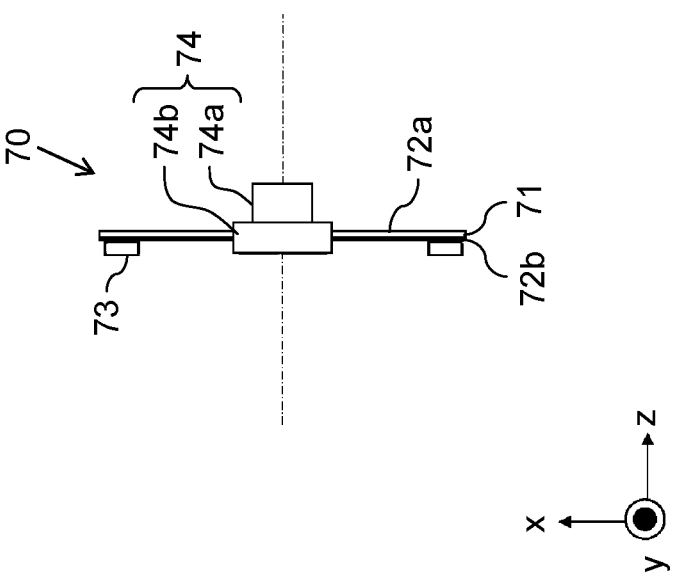

The structure of phosphor wheel 70 will be described with reference to FIG. 2A and FIG. 2B. FIG. 2A is a side sectional view of phosphor wheel 70 viewed from the +y direction of FIG. 1. FIG. 2B is a front view of phosphor wheel 70 viewed from the left side of FIG. 2A (from the −z direction of FIG. 1). As shown in FIG. 2A, phosphor wheel 70 includes disk-shaped transparent base plate 71, ring-shaped phosphor 73 formed on transparent base plate 71, and motor 74 for rotating transparent base plate 71.

Transparent base plate 71 is fixed to motor 74 at rotating section 74a of motor 74 mounted on mounting hub 74b, and is rotated under the control of a controller (not shown in the figures). In mounting hub 74b, transparent base plate 71 is, for example, sandwiched between a hub plate and a presser part with a screw.

Transparent base plate 71 is a disk-shaped transparent substrate, that is, for example, a sapphire plate which has high thermal conductivity. Transparent base plate 71 has antireflection coat 72a on its light input side (non-phosphor-bearing surface), and dichroic coat 72b on its light output side (phosphor-bearing surface). Dichroic coat 72b allows blue light as the excitation light E to pass through it, and reflects light in a different wavelength range from the excitation light E. Dichroic coat 72b is an example of a reflective coat used in phosphor wheel 70. On the surface of dichroic coat 72b, there are first phosphor region 73a, second phosphor region 73b, and transparent region 75 which together form a ring shape as shown in FIG. 2B.

First phosphor region 73a is arc-shaped, which is part of the ring shape whose center is same as the axis of rotation of transparent base plate 71. First phosphor region 73a is coated with a phosphor that emits yellow light with a main wavelength of about 570 nm under the excitation of blue light with a wavelength of about 455 nm.

Second phosphor region 73b is arc-shaped, which is part of the ring shape whose center is same as the axis of rotation of transparent base plate 71. Second phosphor region 73b is coated with a phosphor that can emit green light with a main wavelength of about 550 nm under the excitation of blue light with a wavelength of about 455 nm.

First phosphor region 73a and Second phosphor region 73b are coated with a yellow phosphor Py and a green phosphor Pg, respectively, on the surface of dichroic coat 72b of transparent base plate 71 with a transparent binder B between them.

One example of the yellow phosphor Py is $Y_3Al_5O_{12}$:$Ce_3^+$. One example of the green phosphor Pg is $Lu_3Al_5O_{12}$:$Ce_3^+$. One example of the transparent binder B is a silicone resin.

Transparent region 75 is not coated with phosphor, and allows the excitation light E to pass through it without changing its wavelength. Transparent region 75 preferably has any of the following configurations: dichroic coat 72b alone, dichroic coat 72b with the binder B coated thereon, and antireflection coat 72a deposited instead of dichroic coat 72b.

The blue light as the excitation light E passes through antireflection coat 72a of phosphor wheel 70 from the right side of FIG. 2A (from the +z direction), and is incident on transparent base plate 71. The blue light then passes through dichroic coat 72b and is irradiated to first phosphor region 73a, second phosphor region 73b, and transparent region 75.

Phosphor wheel 70 makes one rotation through the three regions: first phosphor region 73a, second phosphor region 73b, and transparent region 75 in one frame (e.g., ¹⁄₆₀ second).

To be more specific, the light irradiated to phosphor wheel 70 passes through first phosphor region 73a (the first segment), second phosphor region 73b (the second segment), and transparent region 75 (the third segment) in that order in the time corresponding to one frame. In other words, motor 74 is controlled so that phosphor wheel 70 makes one rotation in the time corresponding to one frame.

The excitation light E incident on first phosphor region 73a excites the phosphor Py and makes it emit a yellow fluorescence Fy isotropically. The excitation light E incident on second phosphor region 73b excites the phosphor Pg and makes it emit a green fluorescence Fg isotropically. Of the excited yellow fluorescence Fy and green fluorescence Fg, the components emitted in the direction opposite to the direction of the excitation light E are reflected by dichroic coat 72b and are emitted in the direction of the excitation light E together with the other components, which are emitted in the direction of the excitation light E. Meanwhile, the excitation light E incident on transparent region 75 passes through transparent region 75 just as it is.

Thus, the excitation light E irradiated to the first and second segments of phosphor wheel 70 is converted into the yellow fluorescence Fy and the green fluorescence Fg, respectively. Meanwhile, the excitation light E irradiated to the third segment passes through phosphor wheel 70 as it is as shown in FIG. 1, then is collimated by lens 31 and lens 32, and is irradiated to color filter wheel 80 through lens 33.

Transparent base plate 71 including phosphor 73 that is excited by the excitation light E and emits fluorescence in the direction of the excitation light E is an example of a transparent fluorescent plate.

Structure of Color Filter Wheel 80

The structure of color filter wheel 80 will now be described with reference to FIG. 3A and FIG. 3B. FIG. 3A is a side sectional view of color filter wheel 80 viewed from the +y direction of FIG. 1. FIG. 3B is a front view of color filter wheel 80 viewed from the right side of FIG. 3A (from the +z direction).

As shown in FIG. 3A, color filter wheel 80 includes disk-shaped transparent base plate 81 and motor 84 for rotating transparent base plate 81.

Transparent base plate 81 is fixed to motor 84 at rotation section 84a of motor 84 mounted on mounting hub 84b, and is rotated under the control of a controller (not shown in the figures). In mounting hub 84b, transparent base plate 81 is, for example, fixed to a hub.

Transparent base plate 81 is, for example, a glass substrate that is highly transparent in the entire visible wavelength range.

Transparent base plate 81 has, on its light input side, dichroic coat 82 consisting of color filters 82a, 82b, and 82c. Transparent base plate 81 further has antireflection coat 83 on its light output side. Dichroic coat 82 allows selected wavelengths of light to pass through it, and reflects the remaining wavelengths to achieve desired color light. Dichroic coat 82 is an example of a reflective coat used in color filters.

Figure 4A:
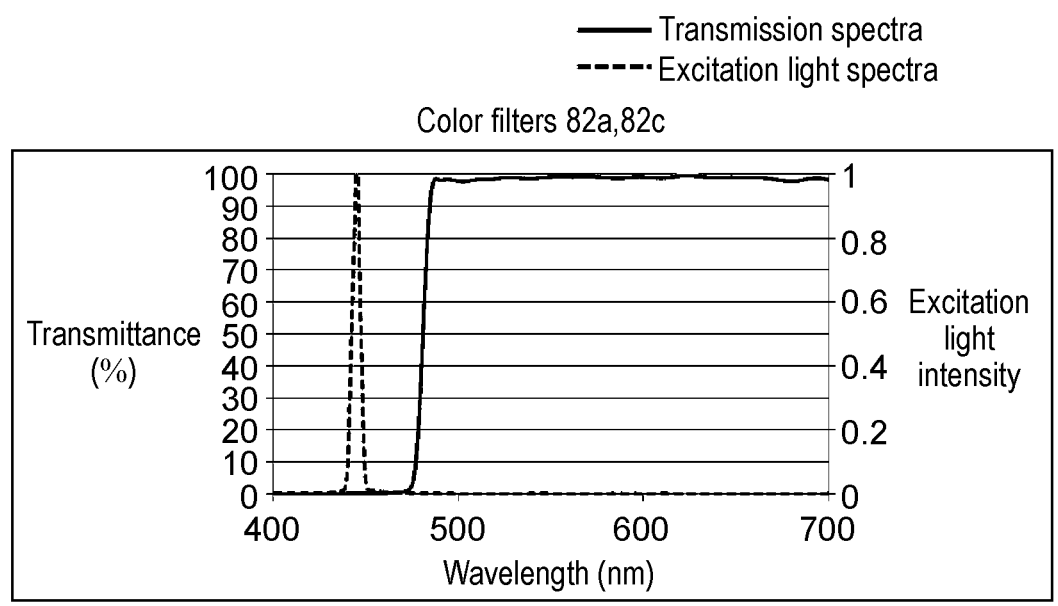
FIG. 4A and FIG. 4B show spectra of color filters.

Color filter wheel 80 has four segments shown in FIG. 3B. In the spectra of FIG. 4A, color filter 82a as the first segment and color filter 82c as the third segment are each formed of a color filter (dichroic coat) having the property of high transparency in the visible wavelength range longer than 480 nm, and high reflectance in the visible wavelength range of 480 nm or shorter. Therefore, as shown in FIG. 4A, color filters 82a and 82c are highly reflective to the excitation light with a wavelength of about 455 nm.

Figure 4B:
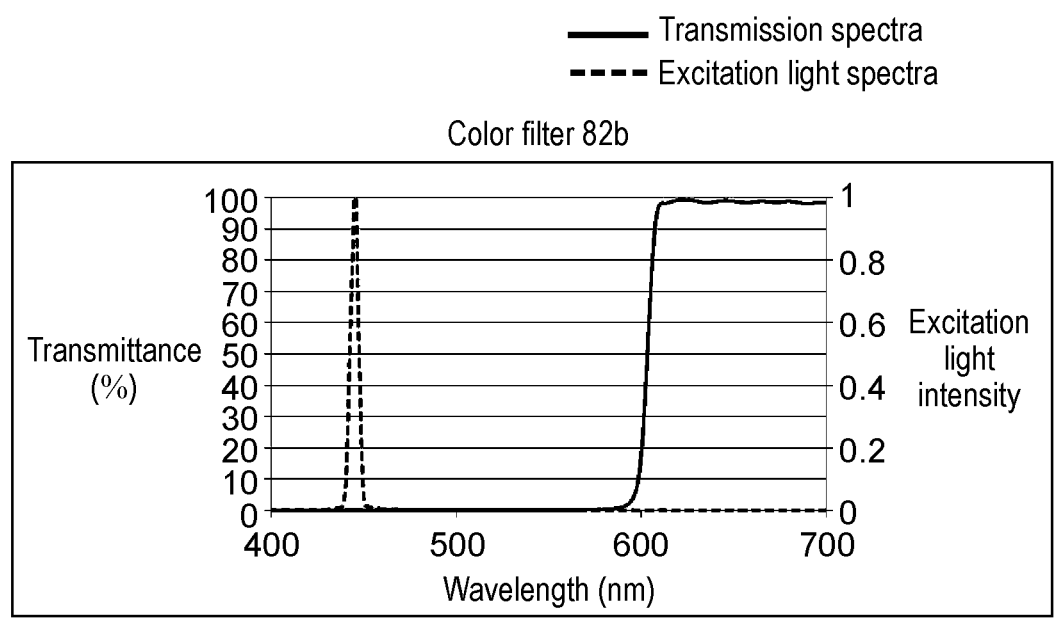

In the spectra of FIG. 4B, color filter 82b as the second segment is formed of a color filter (dichroic coat) having the property of high transparency in the visible wavelength range longer than 600 nm, and high reflectance in the visible wavelength range of 600 nm or shorter. Therefore, as shown in FIG. 4B, color filter 82b is also highly reflective to the excitation light with the wavelength of about 455 nm.

Thus, color filters 82a, 82b, and 82c allow selected wavelengths of the incident light to pass through them and reflect the remaining wavelengths so as to achieve desired color light.

Light diffusion region 85 as the fourth segment is a diffuser for diffusing incident light. The diffuser includes, for example, a large number of micro-lens arrays formed on the surface of transparent base plate 81. Each segment is arc-shaped around the axis of rotation of transparent base plate 81. Color filter wheel 80 can have either of the following configurations: different kinds of color filters and a diffusion surface that are locally and integrally arranged on a single transparent base plate, or different kinds of arc-shaped filters and a diffuser that are fixedly and integrally arranged.

Phosphor wheel 70 and color filter wheel 80 are rotated synchronously. To be more specific, color filter wheel 80 is rotated so that the four segments make one rotation in the time corresponding to one frame (e.g., 1/60 seconds).

Color filters 82a, 82b, and 82c are examples of a color filter plate that allows selected wavelengths of the light incident from phosphor wheel 70 to pass through them and cut off the remaining wavelengths so as to achieve desired color light.

The Timing of Phosphor Wheel 70 and Color Filter Wheel 80

The rotation of phosphor wheel 70 and color filter wheel 80 is controlled so that the yellow fluorescence Fy from first phosphor region 73a of phosphor wheel 70 can be incident on color filters 82a and 82b of color filter wheel 80. To achieve this, the angle of first phosphor region 73a is made equal to the sum of the angles of color filters 82a and 82b.

When the yellow fluorescence Fy from first phosphor region 73a passes through color filter 82a, color filter 82a generates yellow component light Ly by reflecting visible light with wavelengths of 480 nm or shorter, and allowing visible light with wavelengths longer than 480 nm to pass through it. When the yellow fluorescence Fy from first phosphor region 73a passes through color filter 82b, color filter 82b generates red component light Lr by reflecting visible light with wavelengths of 600 nm or shorter, and allowing visible light with wavelengths longer than 600 nm to pass through it.

The rotation of phosphor wheel 70 and color filter wheel 80 is controlled so that the green fluorescence Fg from the second phosphor region 73b of phosphor wheel 70 can be incident on color filter 82c of color filter wheel 80. To achieve this, the angle of second phosphor region 73b is made equal to the angle of color filter 82c. When the green fluorescence Fg from second phosphor region 73b passes through color filter 82c, color filter 82c generates green component light Lg by reflecting visible light with wavelengths of 480 nm or shorter, and allowing visible light with wavelengths longer than 480 nm to pass through it.

The rotation of phosphor wheel 70 and color filter wheel 80 is controlled so that the excitation light E that has passed through transparent region 75 of phosphor wheel 70 can be incident on light diffusion region 85 of color filter wheel 80. To achieve this, the angle of transparent region 75 is made equal to the angle of light diffusion region 85. The excitation light E that has passed through light diffusion region 85 is diffused by light diffusion region 85 and generates blue component light Lb.

Structure of Illumination Apparatus 11

As shown in FIG. 1, illumination apparatus 11 further includes rod integrator 34, lens 35, lens 36 and lens 37 in addition to the above-described lens 33 and color filter wheel 80. The light from rod integrator 34 is relayed by lenses 35, 36, and 37, and is incident as the light from illumination apparatus 11 on imaging unit 12.

Structures of Imaging Unit 12 and Projection Unit 13

Imaging unit 12 is a device for generating images from light coming from illumination apparatus 11. As shown in FIG. 1, imaging unit 12 includes total internal reflection prism 42 and a single DMD 41, which is a imager.

Total internal reflection prism 42, which has surface 42a for total reflection, introduces the light from illumination apparatus 11 to DMD 41. DMD 41, which includes a plurality of movable micro-mirrors, is controlled by a controller (not shown in the figures) according to both the timing of component light of each color incident on the respective micro-mirrors and the received video signal. DMD 41 then modulates the component light of each color with the video signal. The light that has modulated by DMD 41 passes through total internal reflection prism 42 and is led to projection lens 50 (see FIG. 1). Projection lens 50 is an example of a projection optical system.

Projection unit 13 includes projection lens 50 and a screen (not shown in the figures). Projection lens 50 projects temporally-synthesized video light onto the screen.

Structure of Compartment 90

The structure of compartment 90 for phosphor wheel 70 will now be described with reference to FIG. 5. Compartment 90 is of sealed type for storing at least phosphor wheel 70 of the components of light source system 10. Compartment 90 is composed of partition walls 90A, 90B, 90C, 90D, 90E (top surface) and 90F (bottom surface). In the present exemplary embodiment, compartment 90 stores light source 20, condenser lens 30, diffuser 60, and lens 31 in addition to phosphor wheel 70. Compartment 90 is made of a material with high thermal conductivity, such as aluminum or copper.

Light source 20 also serves as the boundary between the inside and outside of partition wall 90A of compartment 90. Light source 20 includes a heat sink (not shown in the figures) for air cooling outside partition wall 90A.

Lens 31 serves as both the light path, and the boundary between the inside and outside of partition wall 90C of compartment 90. Lens 31 has a light input side inside partition wall 90C and a light output side outside partition wall 90C.

Partition wall 90C of compartment 90 is opposed to the fluorescence light output side of phosphor 73. Compartment 90 includes, on the inner surface of partition wall 90C, heat-receiving section 91A for transferring heat generated in phosphor 73 to compartment 90. As shown by the one-dot chain line of FIG. 5, heat-receiving section 91A is a heat absorber layer made by applying a heat-absorbing paint for absorbing heat in phosphor 73 into the inner surface of partition wall 90C. As shown by the two-dot chain line of FIG. 5, compartment 90 includes, on the outer surface of partition wall 90C, heat-dissipation section 91B for dissipating the heat absorbed into heat-receiving section 91A to the outside of compartment 90. Heat-dissipation section 91B is a heat radiator layer, made, for example, by applying a heat-dissipation paint having the same resin composition as the heat-absorbing paint applied to the surface of heat-receiving section 91A. Heat-receiving section 91A and heat-dissipation section 91B are thermally connected together to form heat exchange section 91.

Heat-receiving section 91A for receiving the heat generated in phosphor 73 is located adjacent to phosphor 73 of phosphor wheel 70 for better heat reception.

Figure 6:
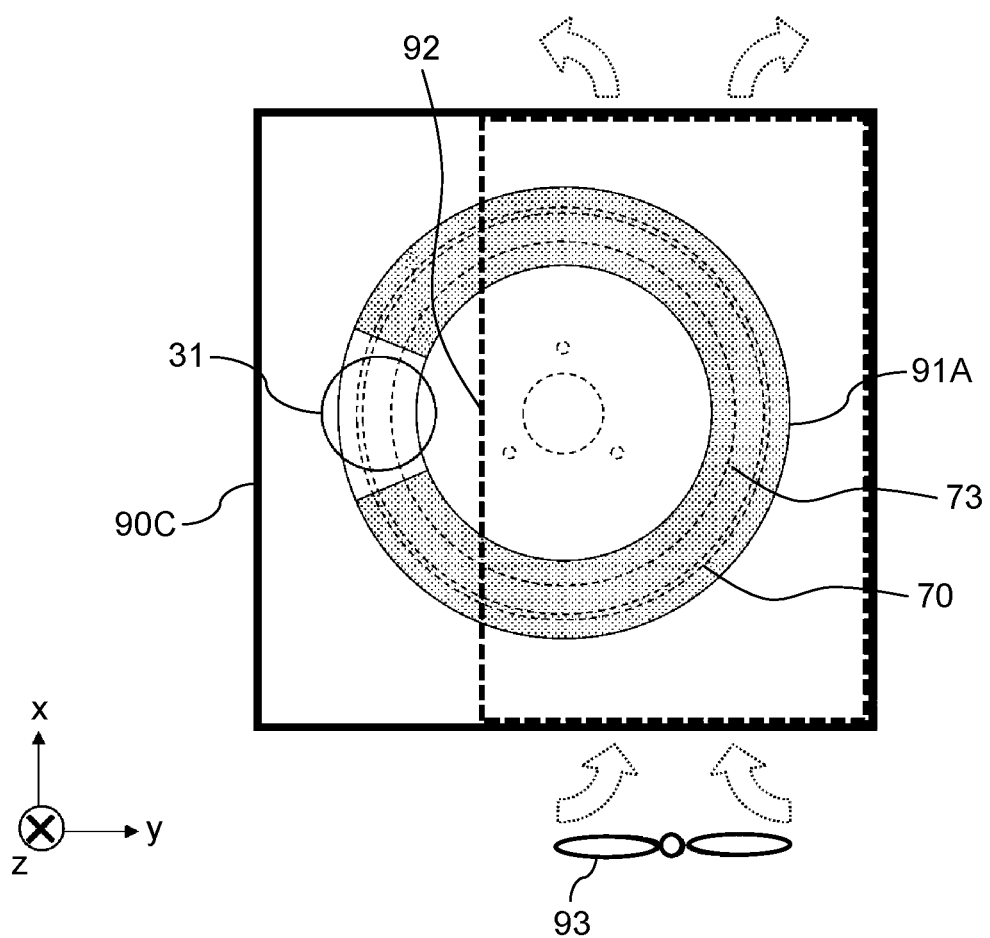
FIG. 6 shows the area of a heat-receiving section on a partition wall.

The area of heat-receiving section 91A in partition wall 90C will now be described with reference to FIG. 6. FIG. 6 is a transparent view of partition wall 90C viewed from the light output side of transparent base plate 71. Partition wall 90C has a hole in which lens 31 for light transmission is installed. Phosphor wheel 70 is located approximately at the center of partition wall 90C.

Heat-receiving section 91A is located on the inner surface of partition wall 90C and is opposed to at least the front side of phosphor 73. To be more specific, heat-receiving section 91A is a hear absorber layer prepared by applying a heat-absorbing paint in a ring shape to the region of partition wall 90C that is opposed to the front side of phosphor 73 except the location of lens 31. Heat-receiving section 91A is the gray-shaded area of FIG. 6.

The heat-absorbing paint may be applied to the entire surface of partition wall 90C instead of to the ring shape shown in FIG. 6. Heat-receiving section 91A may alternatively be made by plating or anodizing the surface of partition wall 90C.

Heat-dissipation section 91B for dissipating the heat received in heat-receiving section 91A may alternatively be a heat dissipation fin integral with partition wall 90C.

Compartment 90 further includes, at the outside of partition wall 90C, air-duct 92 for conveying cooling air that cools the outer surface of partition wall 90C. Air-duct 92 includes cooling fan 93 for dissipating, at the outer surface of partition wall 90C, the heat received on the inner surface of partition wall 90C.

Compartment 90 further includes a blowing device (not shown in the figures) for circulating the air inside compartment 90 to obtain better cooling performance. To be more specific, the blowing device is a small fan or a air-conveying plate (not shown in the figures) inside phosphor wheel 70.

Structure of the Heat-Absorbing Paint

The heat-absorbing paint is a resin composition prepared by highly filling silicone or other resin as a binder with one or more kinds of metal oxides such as zinc oxide or cordierite. In this configuration, the heat-absorbing paint has an infrared emissivity high enough to absorb the heat of the heating element through infrared electromagnetic waves, and to dissipate the heat to the outside of compartment 90. Thus, heat-receiving section 91A has both heat-absorbing and -dissipating performance, thereby suppressing a temperature rise of compartment 90.

Heat Pathway in Light Source System 10

Figure 7:
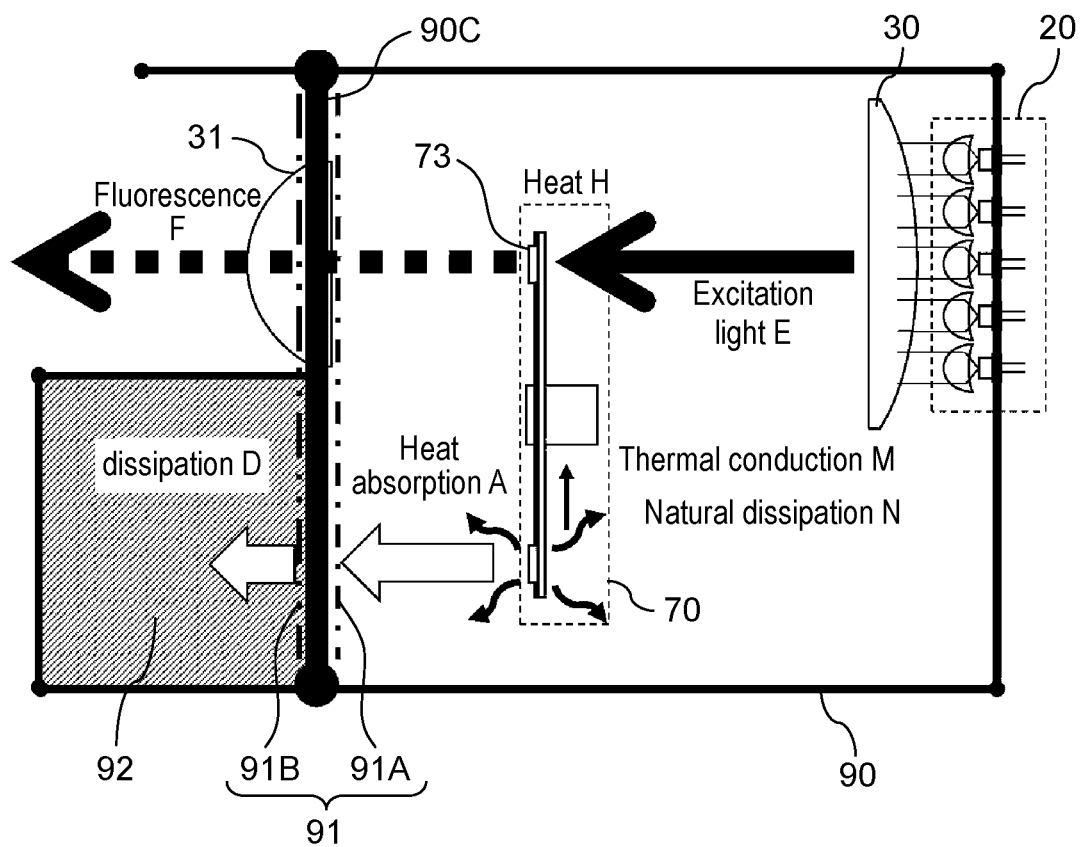
FIG. 7 is a schematic diagram showing energy transfer in the light source system according to the present disclosure.

The main energy pathway in the light source system 10 will now be described with reference to FIG. 7.

The excitation light E from light source 20 is incident on phosphor 73 of phosphor wheel 70 through condenser lens 30. Phosphor 73 emits the fluorescence F generated by the energy of the incident excitation light E. The fluorescence F is incident on color filter wheel 80 through lens 31.

During the fluorescence emission caused by the excitation light E, the energy that is not converted into the fluorescence F, which is the light energy, is absorbed as heat H and stored into phosphor wheel 70.

The heat H generated in phosphor 73 of phosphor wheel 70 is dissipated from phosphor 73 in the form of thermal conduction M, natural dissipation N, and heat absorption A. The thermal conduction M indicates the heat conducted to transparent base plate 71. The natural dissipation N indicates the heat conducted from phosphor 73 directly into the air in compartment 90. The heat absorption A indicates the heat absorbed into heat-receiving section 91A through infrared electromagnetic waves.

The heat indicated by thermal conduction M and the natural dissipation N is further dissipated to the outside of compartment 90 via the thermal conduction to the air inside compartment 90 and the thermal conduction inside compartment 90. The heat can be better dissipated to the outside of compartment 90 by providing heat-receiving section 91A coated with the heat-absorbing paint on any of partition walls 90A, 90B, 90D, 90E and 90F, and further providing heat-dissipation section 91B on any of partition walls 90A, 90B, 90D, 90E and 90F.

The heat indicated by the heat absorption A is absorbed into heat-receiving section 91A, then introduced to heat-dissipation section 91B through partition wall 90C, and dissipated as the heat indicated by dissipation D to the outside of compartment 90. Air-duct 92 located outside partition wall 90C conveys cooling air for improving the efficiency of dissipating the heat indicated by the dissipation D to the outside of heat-dissipation section 91B.

Advantage and Others

In a light source system that excites fluorescence, it is preferable that a phosphor wheel functioning as an excitation light source should be hermetically stored to protect from dust. However, when the phosphor wheel is hermetically stored in a wheel house as a compartment, the heat in the phosphor raises the atmospheric temperature in the compartment, whereas the heated air cannot be exchanged with outside air. As a result, the phosphor wheel cannot be cooled enough even if a fan is used to blow air to the phosphor of the phosphor wheel. This temperature rise may be likely to reduce efficiency or reliability.

Furthermore, in a light source system that excites fluorescence using a solid-state light source such as a laser light source, it is necessary to appropriately cool the heat generated in a fluorescence conversion unit that converts excitation light into fluorescence. The phosphor wheel for emitting fluorescence prevents a temperature rise of the phosphor by rotating itself to prevent energy localization on the phosphor. However, such a phosphor wheel generates high heat due to continuous excitation. This may increase the temperature of the phosphor and decrease the fluorescence conversion efficiency due to the temperature quenching of the phosphor.

In the present exemplary embodiment, in compartment 90 for storing phosphor wheel 70, heat-receiving section 91A is prepared by coating the heat-absorbing paint on the inner surface of partition wall 90C that is very close to phosphor 73, which is the heat source. Thus, phosphor 73 of phosphor wheel 70 is cooled more appropriately by the heat transfer to heat-receiving section 91A through infrared electromagnetic waves in addition to the dissipation by the thermal conduction from phosphor 73.

Variation

Figure 5:
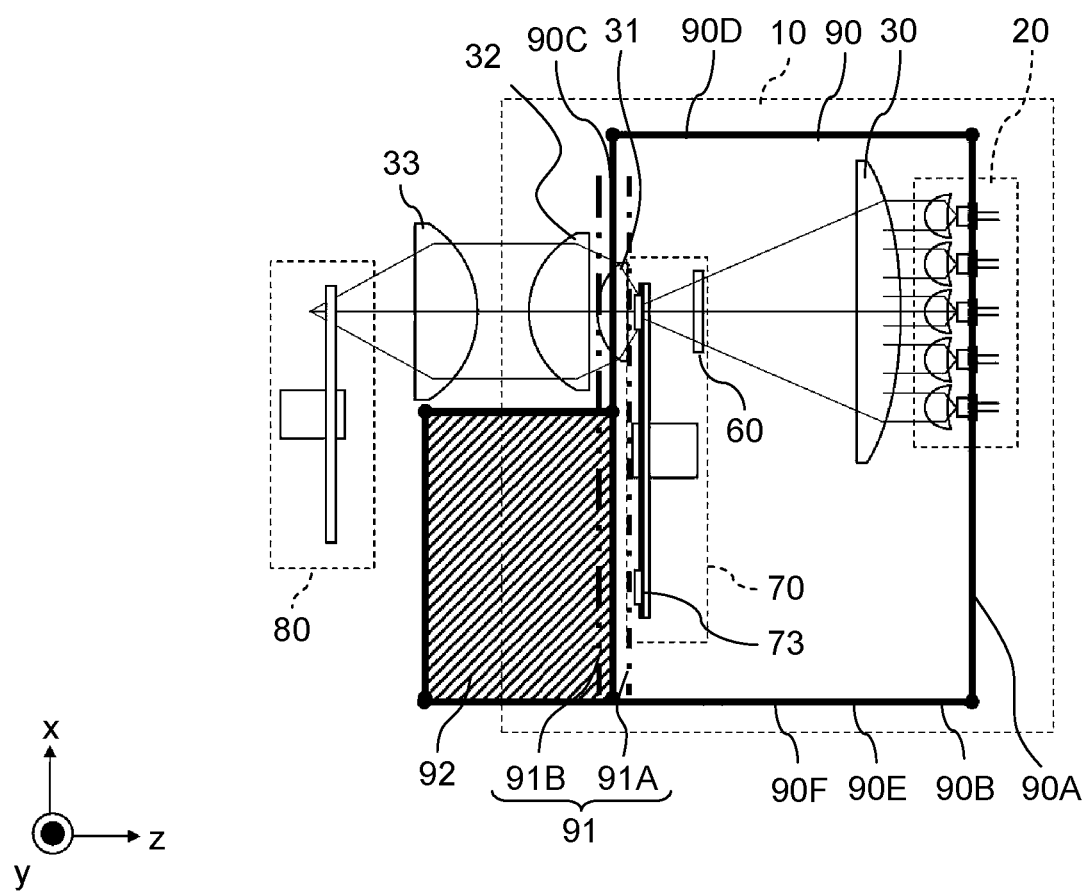
FIG. 5 is a configuration of a light source system according to the first exemplary embodiment of the present disclosure.

Heat exchange section 91 according to the first exemplary embodiment is not limited to the one shown in FIG. 5, and can have other configurations to provide similar advantages. Another configuration of heat exchange section 91 will now be described with reference to FIG. 8 and FIG. 9.

Figure 8:
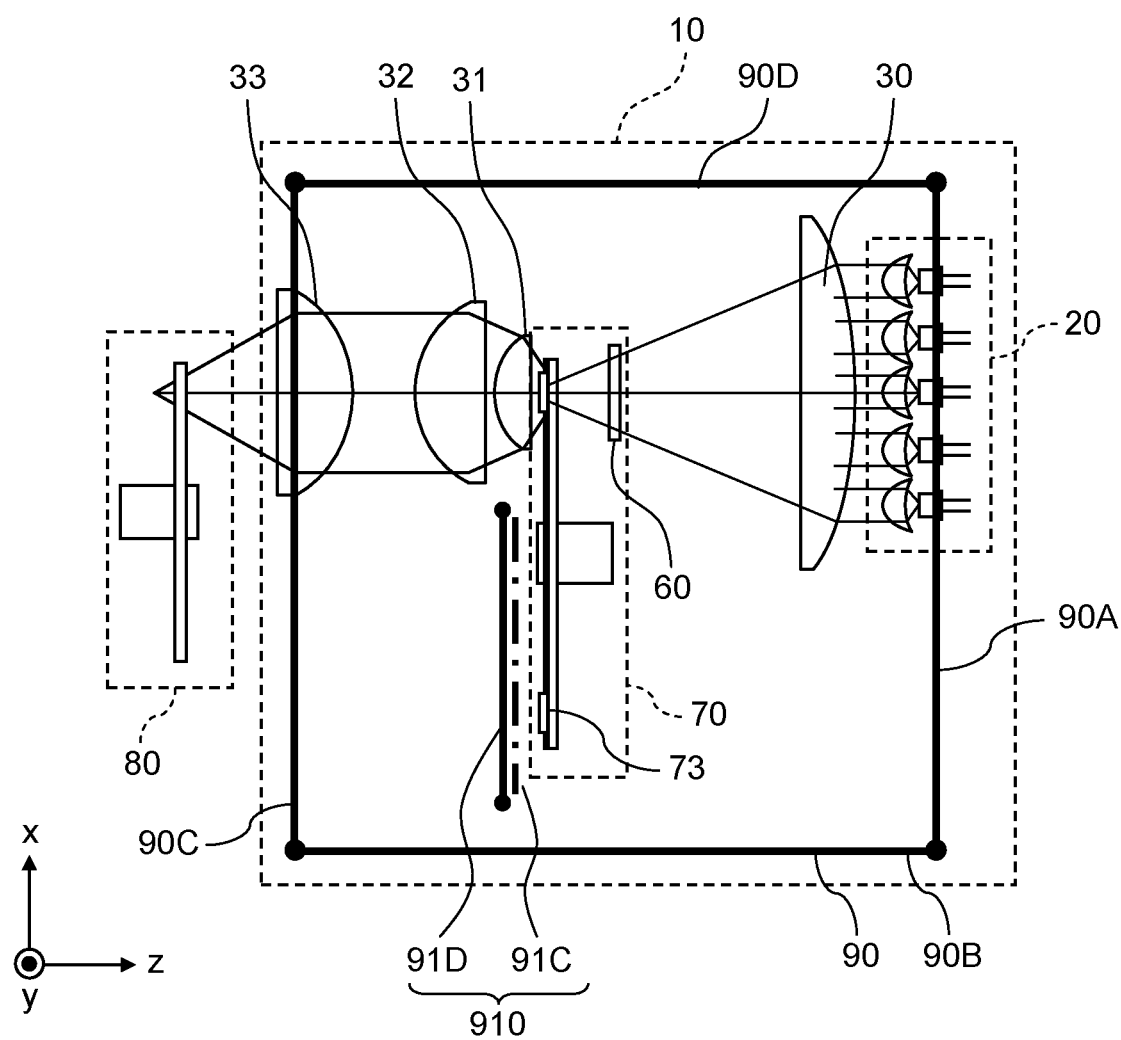
FIG. 8 is another configuration of the light source system according to the first exemplary embodiment of the present disclosure.
Figure 9:
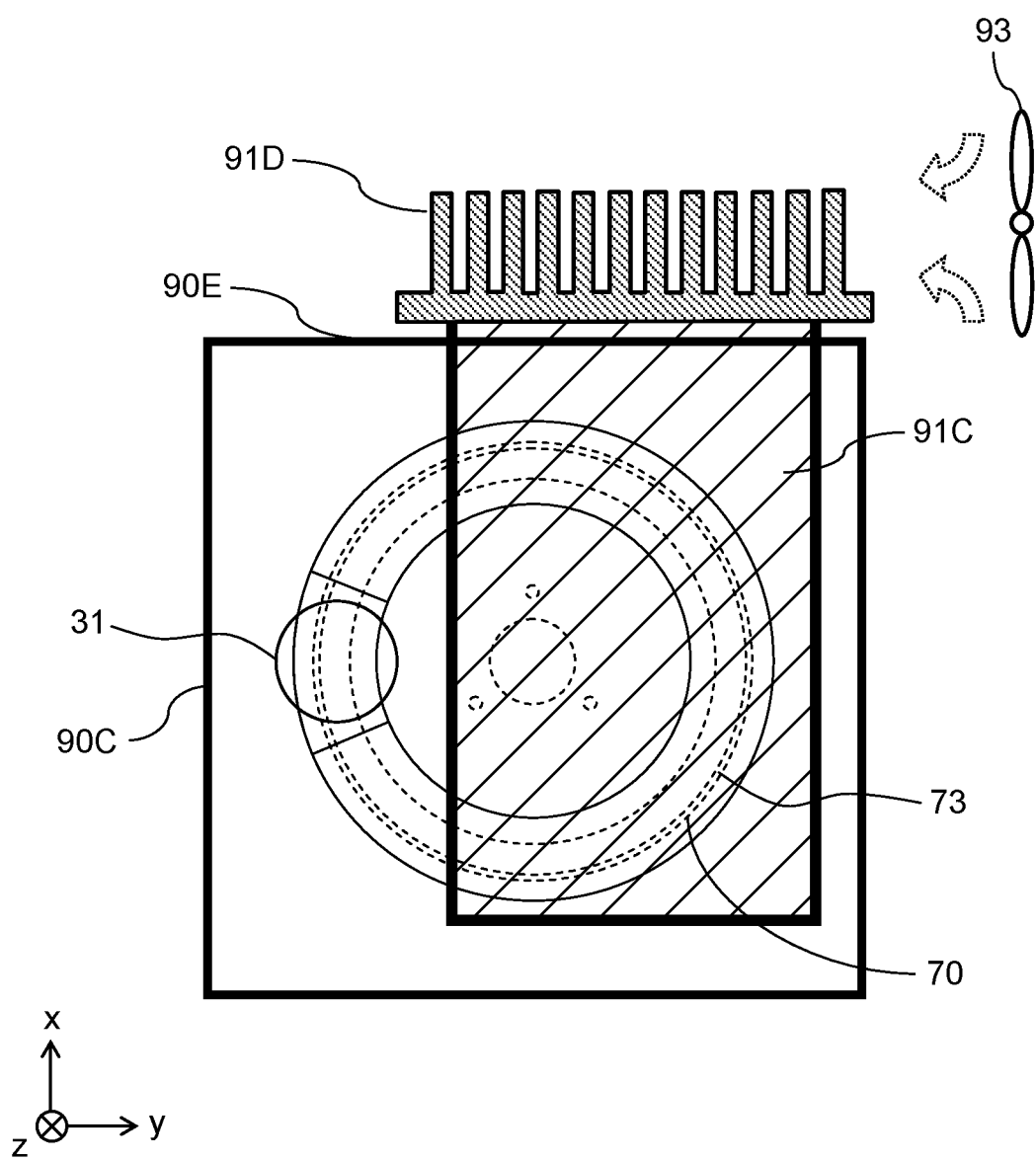
FIG. 9 shows another configuration of a heat exchange section.

FIG. 8 is another configuration of the light source system according to the first exemplary embodiment of the present disclosure. FIG. 9 shows another configuration of the heat exchange section and is a transparent view of partition wall 90C viewed from the light output side of transparent base plate 71.

As shown in FIG. 8 and FIG. 9, heat exchange section 910 includes heat-receiving section 91C and heat-dissipation section 91D. Heat exchange section 910 has been inserted in compartment 90 through the slit in partition wall 90E (the top surface of compartment 90).

Heat-receiving section 91C is consist of plate parts, coated with a heat-absorbing paint. Heat-receiving section 91C is located to be opposed to at least the front side of phosphor 73, which is the heat source side of phosphor wheel 70. Alternatively, heat-receiving section 91C may be located to cover the entire surface of phosphor wheel 70.

Heat-dissipation section 91D is, for example, a heat dissipation fin and is located outside partition wall 90E. Heat-receiving section 91C is connected at its one end to heat-dissipation section 91D, so that heat-receiving section 91C and heat dissipation 91D are thermally connected together. Heat-dissipation section 91D is forcibly cooled by fan 93 for better cooling performance.

Second Exemplary Embodiment

Figure 10:
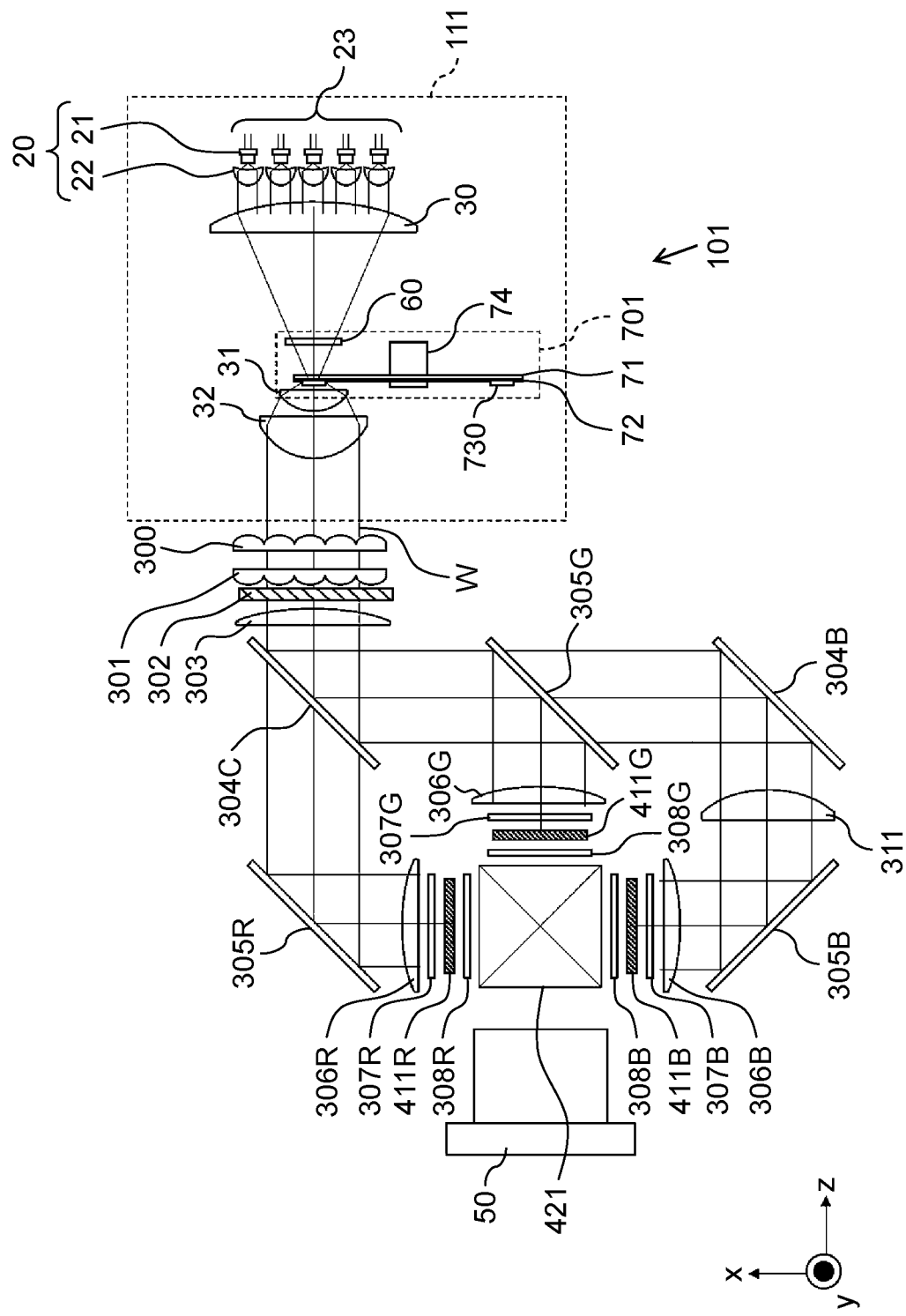
FIG. 10 is a configuration of a projection display apparatus according to a second exemplary embodiment of the present disclosure.

FIG. 10 is a configuration of a projection display apparatus according to a second exemplary embodiment of the present disclosure. In the following description, like components are labeled with like reference numerals with respect to FIG. 1, and the description will be focused on differences from the first exemplary embodiment.

In the first exemplary embodiment, single DMD 41 is used as the imager, and images corresponding to the reference video light generated in a time division manner by light source system 10 are projected onto a screen in a time division manner. Meanwhile, the second exemplary embodiment of the present disclosure is an example of a three-panel liquid crystal display (LCD) projector with LCDs 411R, 411G, and 411B, which are three imagers.

Structure of Light Source System 111

Projection display apparatus 101 according to the present exemplary embodiment includes light source system 111 for emitting white light W.

Light source system 111 includes light source 20, condenser lens 30, diffuser 60, phosphor wheel 701 with phosphor 730, and lenses 31 and 32. Light source 20 emits excitation light E. Condenser lens 30 collects the light from light source 20. Phosphor wheel 701 emits fluorescence F under the excitation of the excitation light E. Lenses 31 and 32 collimate the fluorescence F emitted from phosphor wheel 701.

Light source 20 is in the form of laser light source array 23 arranged in a matrix with laser light sources 21 and collimator lenses 22. Laser light sources 21 emit blue component light Lb (with a wavelength of, e.g., 455 nm), and collimator lenses 22 collimate the light from laser light sources 21.

FIG. 11A and FIG. 11B are configurations of phosphor wheel 701. FIG. 11A is a side sectional view of phosphor wheel 701 viewed from the +y direction of FIG. 10. FIG. 11B is a front view of phosphor wheel 701 viewed from the left side of FIG. 11A (the −z direction of FIG. 10).

Phosphor wheel 701 includes a ring-shaped single phosphor 730 on a transparent base plate, unlike phosphor wheel 70 used in the first exemplary embodiment. Phosphor 730 is a yellow phosphor Py that emits yellow fluorescence Fy containing green component light Lg and red component light Lr when exposed to the excitation light E coming from light source 20. Phosphor wheel 701 is rotated by motor 74 so as to diffuse the heat accumulated in phosphor 730 thereby cooling phosphor 730.

Light source system 111 emits white light W by mixing the yellow fluorescence Fy with the blue component light Lb. The yellow fluorescence Fy contains the green component light Lg and the red component light Lr excited in phosphor wheel 701 when exposed to the excitation light E from light source 20. The blue component light Lb has passed through phosphor wheel 701 without being absorbed into it.

Overall Structure

The white light W from light source system 111 is applied uniformly to LCDs 411R, 411G, and 411B by lens arrays 300 and 301, polarization beam splitter 302, and condenser lens 303. The white light W from condenser lens 303 is separated by dichroic mirror 304C into the red component light Lr and cyan component light Lc, which is a mixture of the green component light Lg and the blue component light Lb. The cyan component light Lc is then separated by mirror 305G into the green component light Lg and the blue component light Lb.

The red component light Lr is reflected by mirror 305R, then passes through lens 306R and input-side polarizer 307R, and modulated into video light by LCD 411R (red LCD). The video light is introduced into color combining cross prism 421 through output-side polarizer 308R.

The green component light Lg is reflected by mirror 305G, then passes through lens 306G and input-side polarizer 307G, and modulated into video light by LCD 411G (green LCD). The video light is introduced into color combining cross prism 421 through output-side polarizer 308G.

The blue component light Lb is reflected by mirrors 304B and 305B, then passes through lens 306B and input-side polarizer 307B, and modulated into video light by LCD 411B (blue LCD). The video light is introduced into color combining cross prism 421 through output-side polarizer 308B.

The blue component light Lb, green component light Lg, red component light Lr modulated into the video light are combined by color combining cross prism 421 and projected, on an enlarged scale, onto a screen (not shown in the figures) by projection lens 50.

Structure of Phosphor Compartment 901

The structure of compartment 901 for phosphor wheel 701 will now be described with reference to FIG. 12. Compartment 901 is of sealed type for storing at least phosphor wheel 701 of the components of light source system 111. Compartment 901 is composed of partition walls 901A, 901B, 901C, 901D, 901E (top surface) and 901F (bottom surface). In the present exemplary embodiment, compartment 901 stores diffuser 60 and lens 31 in addition to phosphor wheel 701. In other words, diffuser 60 is fixed so that it is partially fitted into a window (not shown in the figures) of partition wall 901A of compartment 901. Meanwhile, lens 31 is fixed to a lens attachment window (not shown in the figures) in partition wall 901C and the flat side of lens 31 is partially stored in compartment 901.

Thus, diffuser 60 serves as both the light path and the boundary between the inside and outside of partition wall 901A of compartment 901. Diffuser 60 has a light input side outside partition wall 901A and a light output side inside partition wall 901A.

Lens 31 serves as both the light path and the boundary between the inside and outside of partition wall 901C of compartment 901. Lens 31 has a light input side inside partition wall 901C and a light output side outside partition wall 901C.

Figure 12:
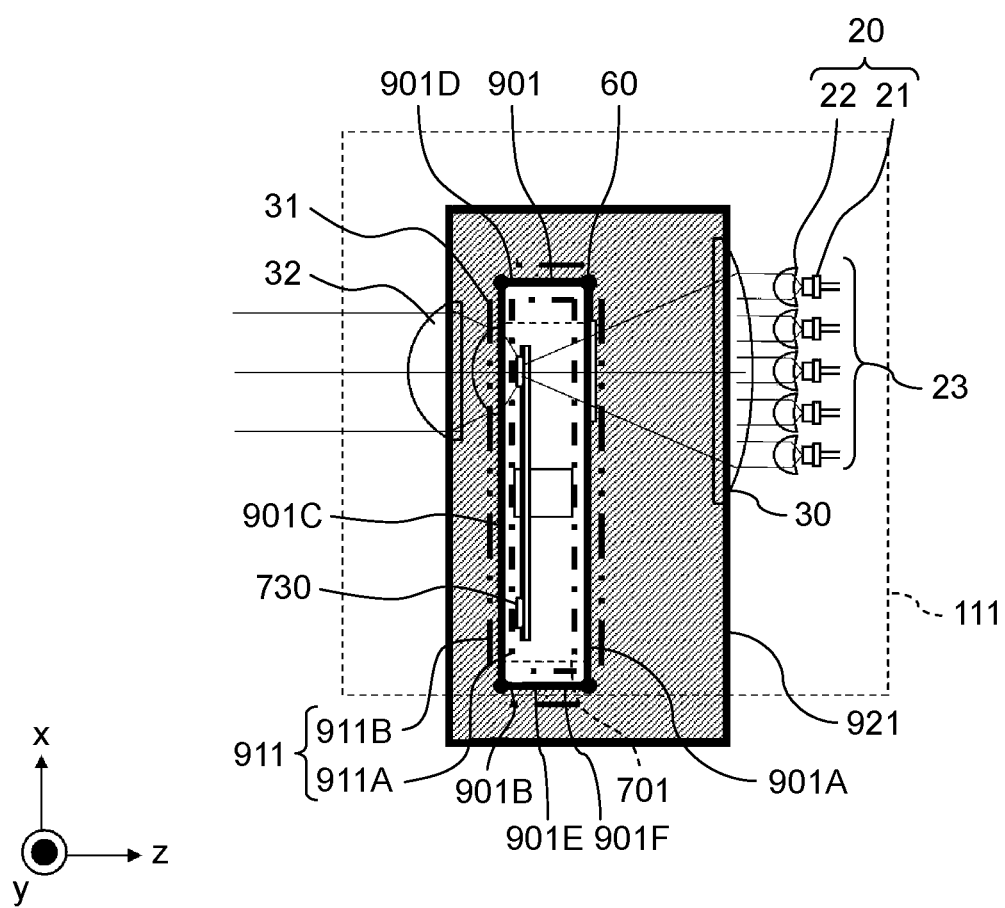
FIG. 12 is a configuration of a light source system according to the second exemplary embodiment of the present disclosure.

Partition walls 901A-901D of compartment 901 has inner surfaces shown by the one-dot chain line of FIG. 12. The inner surfaces have heat-receiving section 911A coated with a heat-absorbing paint for absorbing the heat in phosphor 730 and the heat in the air inside compartment 901. Partition walls 901A-901D of compartment 901 has outer surfaces shown by the two-dot chain line of FIG. 12. The outer surfaces have heat-dissipation section 911B for dissipating the heat absorbed in heat-receiving section 911A to the outside of compartment 901. Heat-receiving section 911A that is opposed to the heat source generated in phosphor 730 is located adjacent to phosphor 730 of phosphor wheel 701 for better heat reception.

The heat-absorbing paint applied as heat-receiving section 911A is applied to the entire inner surface of partition wall 901A except diffuser 60, which is the light path. In partition wall 901C, the heat-absorbing paint is applied to the entire inner surface except the mounting hub of lens 31. In partition walls 901B and 901D, the heat-absorbing paint is applied to the entire inner surfaces.

Heat-dissipation section 911B for dissipating the heat received in partition walls 901A-901D is a heat radiator layer made, for example, by applying a heat-dissipation paint having the same resin composition as the heat-absorbing paint. Heat-dissipation section 911B may alternatively be a heat dissipation fin integral with the partition wall.

Compartment 901 is put in air-duct 921 in order to cool the outer surfaces of compartment 901. Compartment 901 is cooled by a duct and a cooling fan (not shown in the figures) which together introduce cooling air to air-duct 921, for example, in the +y direction.

Advantage and Others

According to the present exemplary embodiment, in compartment 901 for storing phosphor wheel 701, the heat generated inside compartment 901 is absorbed in the entire surface of compartment 901, and dissipated to the outside. As a result, phosphor 730 of phosphor wheel 701 can be cooled more appropriately.

Third Exemplary Embodiment

Figure 13:
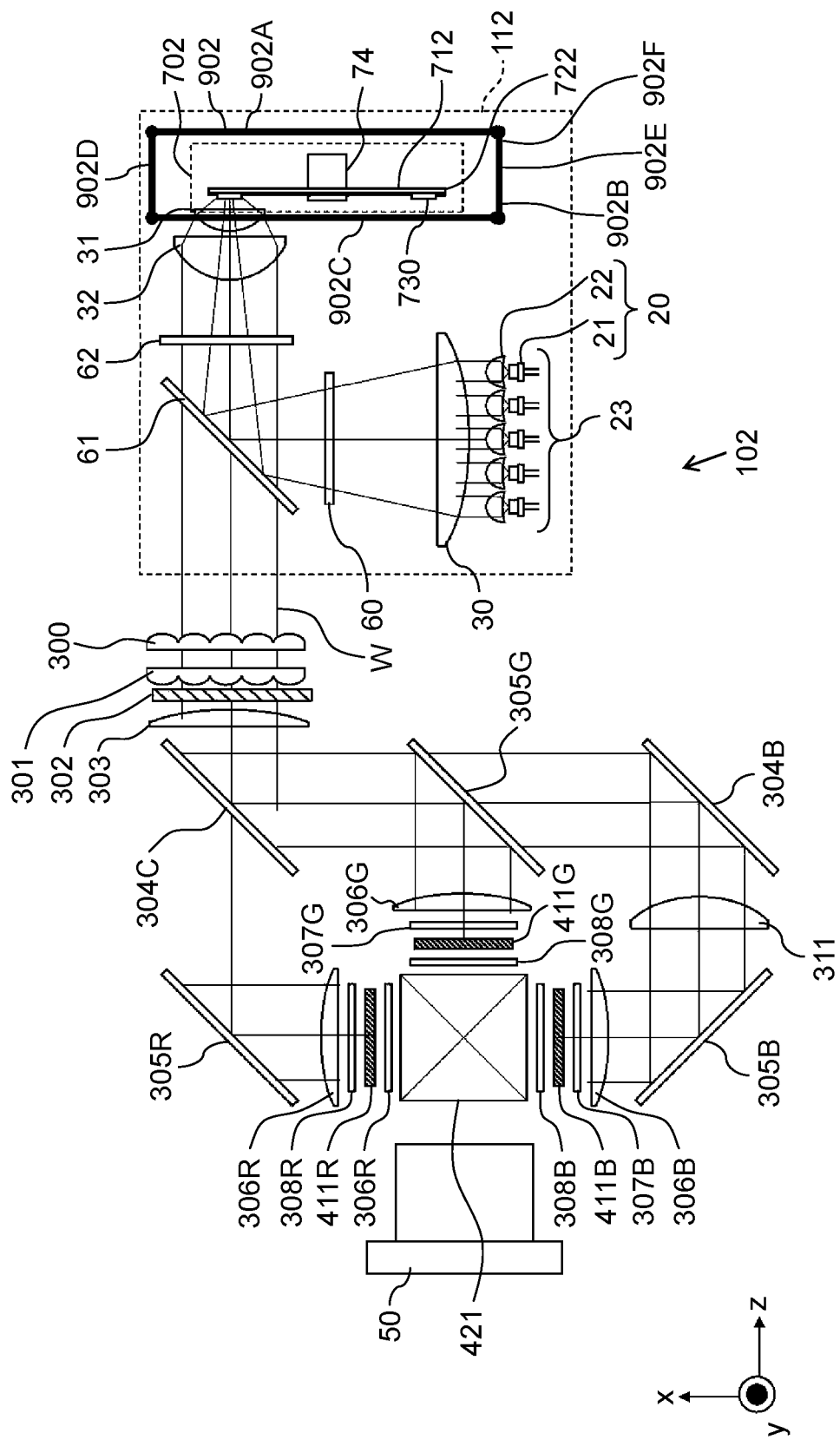
FIG. 13 is a configuration of a projection display apparatus according to a third exemplary embodiment of the present disclosure.

FIG. 13 is a configuration of a projection display apparatus according to a third exemplary embodiment of the present disclosure. In the following description, like components are labeled with like reference numerals with respect to FIG. 10, and the description will be focused on differences from the second exemplary embodiment.

The second exemplary embodiment has employed, as a fluorescence emitter, transparent phosphor wheel 701 composed of transparent base plate 71 and phosphor 730 located on transparent base plate 71. To be more specific, in light source system 111 according to the second exemplary embodiment, the direction in which the excitation light E is incident on phosphor 730 is aligned with the direction in which the fluorescence F emits. Meanwhile, the third exemplary embodiment of the present disclosure is an example of a three-panel LCD projector that includes reflective phosphor wheel 702 composed of metal plate 712 and phosphor 730 located on metal plate 712. The LCD projector is characterized in that the excitation light E and the fluorescence F are incident in the same direction.

Structure of Light Source System 112

Projection display apparatus 102 according to the present exemplary embodiment includes light source system 112 for emitting white light W.

Light source system 112 includes light source 20, condenser lens 30, diffuser 60, quarter wave plate 62, and lenses 31 and 32. Light source 20 emits excitation light E. Condenser lens 30 collects the light from light source 20 on phosphor wheel 702 through dichroic mirror 61. Quarter wave plate 62 is a λ/4 wavelength plate for rotating the polarization direction of the excitation light E by 90 degrees. Lenses 31 and 32 collect the light incident on phosphor wheel 702 and collimate the outgoing fluorescence F.

Light source 20 emits blue component light Lb (with a wavelength of, e.g., 455 nm), which is s-polarized excitation light E. The light Lb is reflected by dichroic mirror 61, then passes through quarter wave plate 62, which is a λ14 wavelength plate, and is converted into circularly polarized light. The converted light Lb is collected by lenses 31 and 32 and is incident on phosphor 730 of phosphor wheel 702.

Unlike phosphor wheel 701, phosphor wheel 702 is made by laying reflective coat 722 such as an aluminum-enhanced reflective coat on the surface of metal plate 712 such as aluminum, and then coating phosphor 730 on the surface of reflective coat 722. This configuration achieves reflective phosphor wheel 702 in which the incident direction of the excitation light E and the emission direction of the fluorescence F are identical. Using metal plate 712 with high thermal conductivity as phosphor wheel 702 enables the heat generated in phosphor 730 to be diffused for better heat dissipation. As a result, a high-luminance white light source is achieved on which the excitation light E with higher output is incident and from which fluorescence F with higher output is emitted. Phosphor 730 is a yellow phosphor Py for emitting yellow fluorescence Fy containing green component light Lg and red component light Lr when exposed to the excitation light E coming from light source 20. The blue component light Lb not absorbed in phosphor 730 is reflected by reflective coat 722, then passes through lenses 31 and 32, and again passes through quarter wave plate 62. As a result, the blue component light Lb is converted into p-polarized light and passes through dichroic mirror 61.

Thus, light source system 112 emits the white light W by mixing the yellow fluorescence Fy emitted from phosphor wheel 702 with the blue component light Lb not absorbed in phosphor 730.

Structure of Phosphor Compartment 902

Phosphor compartment 902 in the third exemplary embodiment is of sealed type for storing at least phosphor wheel 702 of the components of light source system 112. Phosphor compartment 902 of the third exemplary embodiment has the same configuration as that of the second exemplary embodiment except for not including diffuser 60 and the window for placing diffuser 60. To be more specific, compartment 902 of the third exemplary embodiment is composed of partition walls 902A, 902B, 902C, 902D, 902E (top surface) and 902F (bottom surface). In the present exemplary embodiment, compartment 902 stores phosphor wheel 702, and lens 31 which is a light path. In other words, lens 31 is fixed to a lens attachment window (not shown in the figures) in partition wall 902C, and the flat side of lens 31 is partially stored in compartment 902.

Compartment 902 includes a heat-receiving section made by coating the inner surfaces of partition walls 902A-902F with a heat-absorbing paint so as to cool compartment 902.

Advantage and Others

According to the present exemplary embodiment, in compartment 902 for storing reflective phosphor wheel 702, the heat generated in compartment 902 is absorbed in the entire surface of compartment 902, and dissipated to the outside. As a result, phosphor 730 of phosphor wheel 702 can be cooled more appropriately.

The above-described first to third exemplary embodiments only exemplify the techniques of the present disclosure. Therefore, various modification, replacement, addition, and omission can be made within the range of the claims and their equivalents.

The present disclosure is applicable to a light source system including a phosphor excitation light source, and also to a projection display apparatus including the light source system.

What is claimed is:

1. A light source system comprising:
an excitation light source;
a fluorescent plate configured to emit fluorescence when exposed to excitation light from the excitation light source;
a compartment configured to store the fluorescent plate;
a lens which the excitation light is configured to pass through from an interior of the compartment to outside the interior of the compartment; and
an air-duct into which cooling air is configured to flow,
the compartment comprising a heat-receiving section having a heat-receiving surface and a heat-dissipation section thermally connected to each other,
the heat-receiving surface facing a fluorescence light output side of the fluorescent plate, in the compartment,
the heat-dissipation section being located outside the interior of the compartment and constituting a part of a surface of the compartment and constituting a part of a surface of the air-duct, and
the air-duct being located outside of and isolated from the compartment such that air does not flow from the air-duct to the compartment,
wherein the compartment includes a plurality of outer surfaces, and only one of the plurality of outer surfaces is facing the air-duct.

2. The light source system according to claim 1, wherein both the heat-receiving surface and the lens are located on a same side with respect to the fluorescence light output side of the fluorescent plate.

3. The light source system according to claim 1, wherein the fluorescent plate comprises phosphor on the fluorescence light output side, and the heat-receiving surface is adjacent to the phosphor.

4. The light source system according to claim 1, wherein the fluorescent plate comprises phosphor on the fluorescence light output side, and the heat-receiving surface is located to face at least a front side of the phosphor.

5. The light source system according to claim 1, wherein the heat-receiving surface is a surface of a heat absorber layer.

6. The light source system according to claim 1, wherein the heat-receiving surface is a surface of a plated layer.

7. The light source system according to claim 1, wherein the heat-receiving surface is a surface of an anodized layer.

8. The light source system according to claim 1, wherein the heat-receiving surface and the heat-dissipation section are opposed to each other with respect to a partition wall of the compartment.

9. The light source system according to claim 1, wherein the heat-receiving surface is planar and is connected at one end to the heat-dissipation section.

10. The light source system according to claim 1, wherein the heat-dissipation section is heat radiator layer.

11. The light source system according to claim 1, wherein the heat-receiving surface faces a surface outputting fluorescence light of the fluorescent plate.

12. The light source system according to claim 1, further comprising a fan located outside of the compartment, wherein
the fan causes air flow through the air-duct.

13. The light source system according to claim 1, wherein the lens is configured to transmit the fluorescence emitted by the fluorescence plate.

14. A projector apparatus comprising:
the light source system according to claim 1;
an illumination apparatus configured to equalize component light emitted from the light source system and to emit illumination light;
an imaging unit configured to modulate the illumination light emitted from the illumination apparatus with a video signal and to emit video light; and
a projection unit configured to project the video light emitted from the imaging unit on an enlarged scale.

* * * * *